United States Patent [19]

Sertori

[11] 4,134,266
[45] Jan. 16, 1979

[54] HYDRAULIC CONTROL APPARATUSES COMBINED WITH FRICTION BRAKES

[75] Inventor: Jean-Claude Sertori, Eaubonne, France

[73] Assignee: Labavia S.G.E., Paris, France

[21] Appl. No.: 791,033

[22] Filed: Apr. 26, 1977

[30] Foreign Application Priority Data

Apr. 29, 1976 [FR] France .............................. 76 12798
Oct. 15, 1976 [FR] France .............................. 76 31125

[51] Int. Cl.² ............................................. B60T 11/20
[52] U.S. Cl. ...................................... 60/562; 60/549; 60/560; 60/567; 60/581; 60/588
[58] Field of Search ................. 60/547, 549, 560, 562, 60/566, 567, 579, 581, 587, 588, 592, 593; 192/3 TR; 188/345

[56] References Cited

U.S. PATENT DOCUMENTS

| 2,213,947 | 9/1940 | Bowen | 60/567 |
| 3,126,987 | 3/1964 | Stell | 192/3 TR |
| 3,159,974 | 12/1964 | Rodgers | 60/593 |
| 3,683,619 | 8/1972 | Belart | 60/562 |
| 3,844,121 | 10/1974 | Griesenbrock | 60/562 |
| 4,020,931 | 5/1977 | Sertori | 60/567 |

Primary Examiner—Martin P. Schwadron
Assistant Examiner—Abraham Hershkovitz
Attorney, Agent, or Firm—Stevens, Davis, Miller & Mosher

[57] ABSTRACT

Apparatus for hydraulic control of friction brakes of an automobile vehicle which comprises a first master-cylinder directly connected to the hydraulic brake circuit and operated by the driver's brake pedal and a second master-cylinder operated by release of the gas pedal, and connected to the first master-cylinder in place of the reservoir thereof. The first master-cylinder is a tandem master-cylinder which comprises a first piston connected by the intermediary of a linkage to the brake pedal and a second piston dividing the interior of the first master-cylinder into first and second chambers. The first chamber is located between the two pistons and is connected to a first hydraulic brake control-circuit, while the second chamber is situated at an end of said cylinder and is connected to a second hydraulic brake control-circuit. The two chambers are supplied with liquid. The output of the second master-cylinder is connected to a lateral connection leading into one of the chambers in place of the conventional reservoir.

1 Claim, 2 Drawing Figures

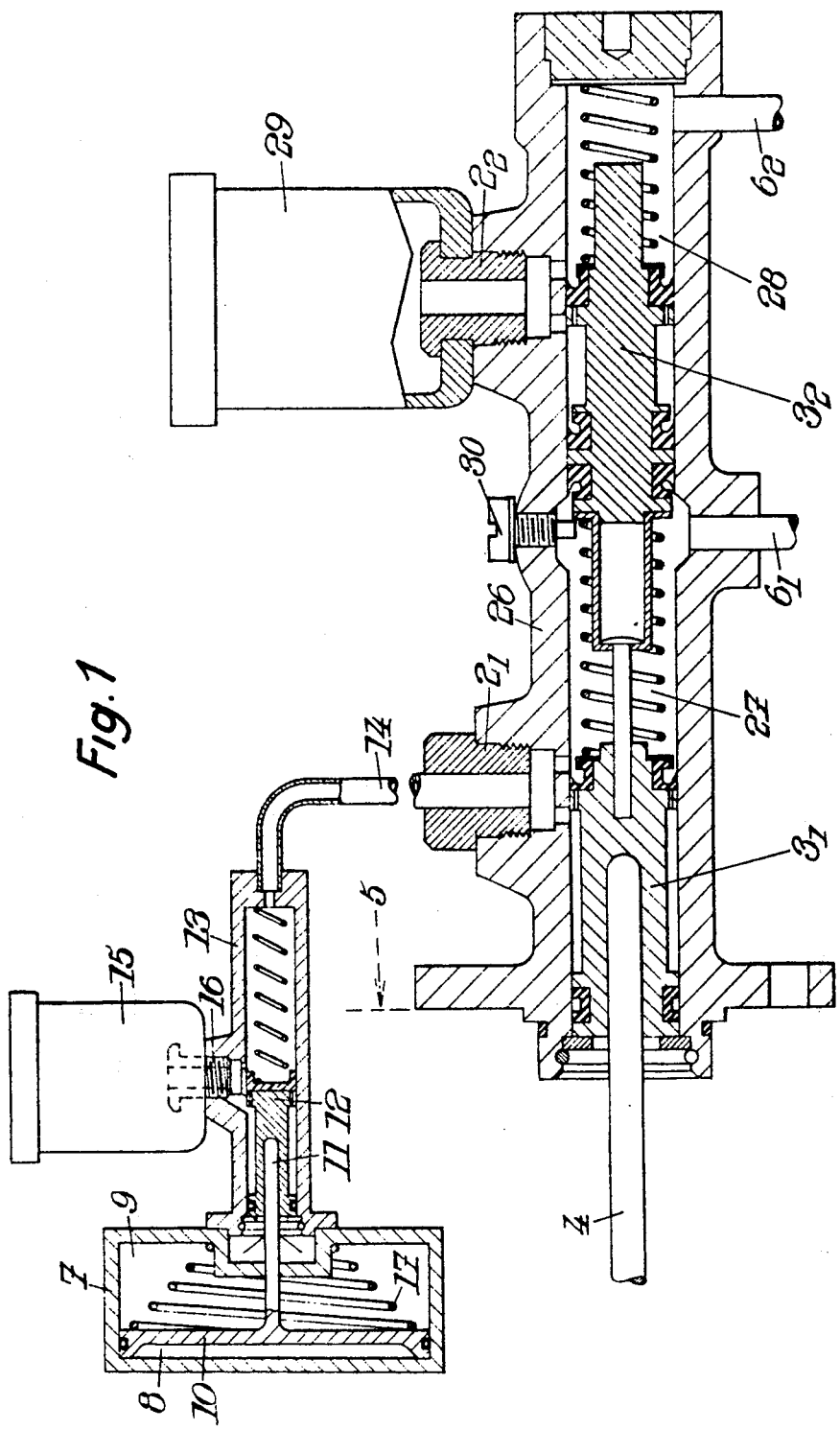

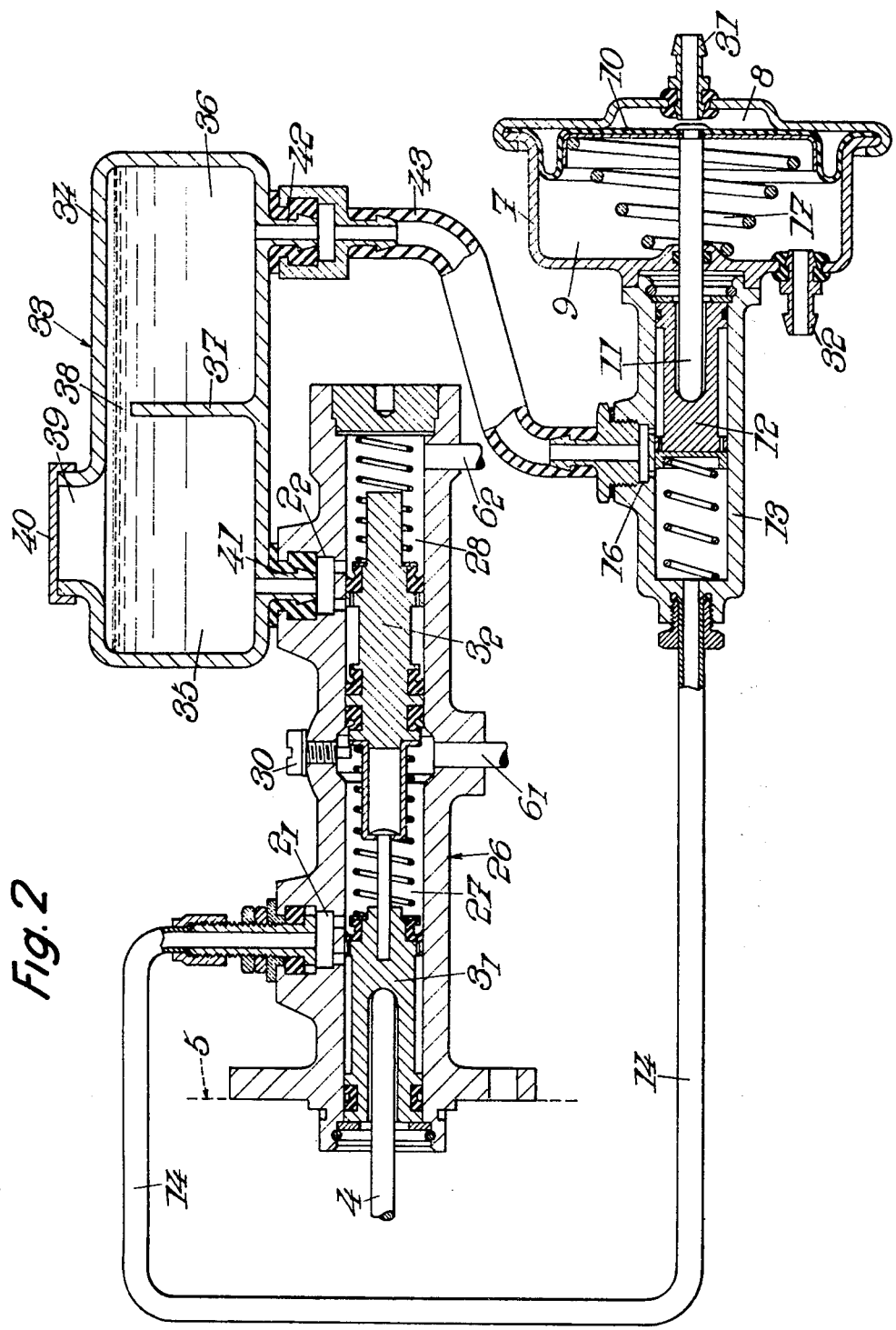

HYDRAULIC CONTROL APPARATUSES COMBINED WITH FRICTION BRAKES

The invention has for object improvements provided for hydraulic control apparatuses combined with friction brakes for automobile vehicles. The invention comprises a first master-cylinder whose piston is controlled by pressure from the driver's foot on a brake pedal and, a second master-cylinder independent of the first and whose piston is controlled by a means other than the said pressure on a brake pedal, preferably by releasing the accelerator-pedal. The output of the first master-cylinder is directly connected to a hydraulic control-circuit for the friction brakes and the output-conduit of the second master-cylinder is connected only to the first master-cylinder. The improvements added to those already provided in the principal U.S. Pat. No. 4,020,931 comprise that the means other than the pressure on the brake pedal is releasable on the initiative of the driver, during the course of the running of the vehicle, is repetitive, and is so arranged as to cause only a relatively gentle hydraulic brake-pressure.

Furthermore the output-conduit of the second master-cylinder is connected to the first master-cylinder in the place usually used to connect the latter to a reservoir of liquid which supplies it, this reservoir being then replaced by this output-conduit.

The present improvements have for object, above all, the simplification of the control-apparatuses concerned using exclusively conventional and well-tried mechanisms, and to facilitate the adaptation of the equipment in question to existing vehicles, especially to automobile vehicles used for touring, while relying upon accessories normally available in the braking-installations of these vehicles.

They relate more particularly to the case where the first master-cylinder is a tandem master-cylinder comprising, in a way known in itself, a first piston connected by the intermediary of a linkage to the brake pedal and a second piston dividing the interior cylindrical cavity of this tandem master-cylinder into two chambers, namely a first chamber situated between the two pistons and connected by a first output-conduit to a first hydraulic braking control-circuit and a second chamber situated at the cylinder-end and connected by a second output-conduit to a second hydraulic braking control-circuit.

In the manner of execution of the control apparatuses of the kind mentioned last, which has been partly described and illustrated in the principal patent, No. 4,020,931, the two chambers of the tandem master-cylinder were supplied, in a way known in itself, through respectively two side ports, and the connection of the output-conduit of the second master-cylinder to this tandem master-cylinder was ensured at the level of an additional chamber situated at the axial extremity of this tandem master-cylinder, opposite that where the second chamber is.

The present improvements are essentially characterized in that one or other of these two reservoirs is replaced by the output-conduit of the second master-cylinder.

In the preferred modes of realisation, the reservoir connected to the side port of the first master-cylinder, other than that to which the output-conduit of the second master-cylinder is connected, is an integral part of the reservoir provided for supplying the second master-cylinder with braking liquid.

The invention comprises, apart from these principal provisions, certain other provisions which are used for preference at the same time and which will be more explicitly mentioned hereafter.

In what follows, there will be described a preferred mode of realisation of the invention, with reference to the attached drawing, in a way which is of course non-limiting.

FIG. 1, of this drawing, shows diagrammatically a composite braking installation for a vehicle installed in conformance to the invention, the whole of the units designated by the references 7 to 16 being represented on this figure in a scale reduced in relation to the other elements for the sake of clarity.

FIG. 2 shows diagrammatically a preferred variant, also conforming to the invention, of this installations.

In each case the braking installation comprises:

a first master-cylinder, made up of a double master-cylinder or tandem master-cylinder 26, actuable by the brake pedal of the vehicle by the intermediary of a linkage 4 and, if required, an assistance mechanism 5, this master-cylinder being suitable for hydraulically controlling the friction brakes of the vehicle by the delivery of liquid into respectively two output-conduits $6_1$ and $6_2$ allocated respectively, for example, to the braking of the front wheels and the back wheels of the vehicle, and a second master-cylinder 13 whose piston 12 is actuable, by the intermediary of a rod 11, from the displacements of a fluid-tight partition 10 dividing a box 7 into compartments 8 and 9.

This second master-cylinder 13 is equipped with an output-conduit 14 and is supplied with liquid through a side port 16 from a reservoir (15 in FIG. 1; 33 in FIG. 2) to which we will return later.

The displacements of the partition 10 in the direction corresponding to the delivery of the liquid, under a relatively gentle pressure, to the output-conduit 14, are automatically controlled, in opposition to the return-force of a spring 17, by releasing the accelerator pedal of the vehicle.

To this end this release is translated advantageously either by the setting at atmospheric pressure of the compartment 8 farthest from the piston 12, if the two compartments 8 and 9 are normally subjected to such a vacuum as that obtained in the admission-pipe of the motor of the vehicle, or by application of such a vacuum to the compartment 9 if the two compartments 8 and 9 are normally set at atmospheric pressure: in the first hypothesis, the connections 31 and 32 (FIG. 2) which respectively serve the two compartments 8 and 9 are used to respectively connect these compartments to a valve with three passages and to the source of the vacuum, the said valve being arranged so as to connect automatically the compartment 8 to the said source of vacuum as long as the accelerator pedal remains depressed and, on the contrary, to the atmospheric pressure when the said pedal is released.

The tandem master-cylinder 26 comprises tow pistons $3_1$ and $3_2$.

The first piston $3_1$ is directly connected to the linkage 4.

The second piston $3_2$ separates the internal cylindrical cavity of the master-cylinder 26 into two chambers 27 and 28.

The chamber 27, situated between the two pistons $3_1$ and $3_2$, is connected to the output-conduit $6_1$.

The chamber 28, situated at the cylinder-end is connected to the output-conduit $6_2$.

The two chambers 27 and 28 are supplied laterally with liquid through respectively two ports $2_1$ and $2_2$.

But whereas supplies are both effected from two reservoirs, as in the realisation described in the principal patent, here there is only one such reservoir (29 on FIG. 1; 33 on FIG. 2) connected to one of the two ports $2_1$ and $2_2$ and it is the output-conduit 14 of the second master-cylinder which is connected to the other port.

In the preferred modes of realisation illustrated in the drawings, the conduit 14 is connected to the port $2_1$ which serves the chamber 27 when the reservoir (29, 33) is connected to the port $2_2$ which serves the chamber 28.

Moreover, there is to be seen at 30 a stop-screw suitable for limiting the reversing path of the piston $3_2$ (to the left on the drawing).

As indicated above, it is only for material reasons and for the sake of clarity that the part of the installation comprising the second master-cylinder 13 has been represented in FIG. 1 in a scale reduced in relation to the remainder of this installation: it is evident that, in reality, the conduit 14 retains the same diameter the whole of its length.

The functioning of this installation is as follows:

A simple foot braking, which manifests itself by pressure on the brake pedal, is effected in the usual way by the exercise of a pressure on the piston $3_1$ in the direction (from left to right in the figure) in which this piston delivers to the conduit $6_1$ the liquid contained in the chamber 27. This delivery has the effect, in addition, of pushing back the piston $3_2$, which delivers to the conduit $6_2$ the liquid contained in the chamber 28; this maneuver thus ensures the integral hydraulic control of all the friction brakes.

The subsequent release of the brake pedal is effected by the reverse of the preceding operations, under the action of various return-springs.

A simple braking by relaxation, controlled by releasing the accelerator pedal, is effected by a delivery of liquid under a reduced pressure into the circuit 14, and, from there, into the chamber 27, which ensures the same effects as the pressure of the piston $3_1$ analysed above, and thus by an actuation of all the brakes, but with a force much weaker then previously.

Finally, provision can also be made for this pressure of delivery of liquid into the conduit 14 to be sufficiently reduced so as not to result in any true braking but simply the putting under pressure of the whole of the braking circuit, with, in particular, taking up of different plays and running through of different "dead paths" by the control parts (pistons $3_1$ and $3_2$).

Such a putting under pressure is of great interest in practice since it makes the braking-installation suitable for responding instantaneously, by an effective braking, to any eventual subsequent pressure on the brake pedal, without one observing the dead path of this pedal at the beginning of its depression.

From the moment when the braking ceases by relaxation, by a new pressure on the accelerator pedal, the putting under pressure of the installation is discontinued under the effect of the return of different springs, an effect which is evidenced by the return, into the second master-cylinder 13, of the little surplus volume of liquid which has been the cause of this putting under pressure.

According to one variant, the respective connections of the reservoir (29; 33) and of the conduit 14 to the ports $2_1$ and $2_2$ are exchanged, the conduit 14 supplying the chamber 28 and the reservoir supplying the chamber 27.

In this case, the functioning is exactly the same as the preceding one for foot brakings.

But for brakings by simple relaxation, the slight over-pressure of the liquid transmitted by the conduit 14 affects only the chamber 28 and the conduit $6_2$, which puts under pressure only the part of the braking installation served by this conduit $6_2$ while actuating, if required, the friction brakes only corresponding to this part of the installation: the slight over-pressure in question does not modify in any way the state of the chamber 27, in view of the back end of the piston $3_2$ being against the screw 30.

In the mode of realisation in FIG. 1 the two ports 16 and $2_2$ are connected respectively to two independent reservoirs of braking liquid 15 and 29.

Now, more and more often, in modern braking installations utilising tandem master-cylinders, one finds no longer two independent reservoirs but a single double reservoir 33 for supplying the two chambers 26 and 27 of these master-cylinders with braking liquid.

It is such a single double reservoir that is used in the mode of realization in FIG. 2 to supply the chamber 28 of the first master-cylinder 26 and the second master-cylinder 13 with braking liquid at the same time.

Such a reservoir 33 is especially constituted by a closed casing 34 comprising two compartments 35, 36 of identical volume, separated one from the other by a vertical interior partition 37 free at its upper part in such a way that communication can be established between these two compartments only at the level of the clearance 38 thus retained.

Such a measure makes it possible to avoid the appearance of a fluid-leak in one of the two circuits supplied by the double reservoir concerned resulting in a total draining of this reservoir and thus in a failure in supply of liquid for the other circuit.

The aforesaid casing comprises in its upper part a single orifice 39 capable of being sealed in a fluid-tight manner by a cap or plug 40 easily removable for the purpose of filling the two compartments 35, 36, with braking liquid.

Couplings 41 and 42 are provided respectively in the bottoms of the two compartments 35 and 36 at the connection-ends of the latter with respectively the two ports $2_2$ and 16, one of these connections being ensured directly and the other by the intermediary of a flexible pipe 43, all required accessories, such as clamping-bands, flexible joints, . . . being of course utilized to ensure the necessary connections in a solid and fluid-tight way.

It is advantageous that the reservoirs for supplying the master-cylinders with braking liquid be placed higher than the master-cylinders which they supply so that the supply be established permanently under a head of liquid.

The replacement of the two independent reservoirs of FIG. 1 by a single reservoir is thus above all advantageous if the latter is placed higher than the two master-cylinders which it supplies.

In the installations of the type diagrammed in FIG. 2, in which the master-cylinder situated highest up is the second 13, the coupling 42 allocated to the clearing of this second master-cylinder is directly connected to the port 16 of the latter whereas the flexible pipe 43 stretches between the other coupling 41 and the port 2₂.

But when the second master-cylinder 13 is placed lower than the first master-cylinder 26, which can be preferable because of the space available under the bonnet of the motor of the vehicle concerned, the connections between the couplings 41 and 42 and the ports 2₂ and 16 are those which have been illustrated in FIG. 2, the first of these connections being established directly and the second by the intermediary of the pipe 43.

Following from which, and whatever the mode of realization adopted, the control apparatus according to the present invention presents manifest advantages in relation to the control apparatuses previously known, and in particular the following:

it makes use of a classic tandem master-cylinder without it being necessary to modify or adapt the latter other than as concerns the exterior connections ensuring its supply with braking liquid, its said supply with braking liquid is ensured by the same reservoirs, and in the same number (two identical, or a single double) as a classic tandem master-cylinder, the apparatus in question allows actuation, by the effect of relaxation, of the whole of a two-part circuit equipped with a tandem master-cylinder, from a simple master-cylinder.

As is evident, and as results moreover already from what preceeds, the invention is not at all limited to those of its modes of application and of realization which have been more especially envisaged; it embraces, on the contrary, all variants, especially those where the single reservoir of FIG. 2 would not be split into two compartments and those where the said single reservoir would be connected directly, that is to say without an intermediary pipe, to the two ports 2₂ and 16 above, then situated at the same level.

I claim:

1. Apparatus for hydraulic control of friction brakes of an automobile vehicle, comprising a first mastercylinder including a piston to be controlled by pressure of the driver's foot on a brake pedal and a second master-cylinder independent of said first master-cylinder, said second master-cylinder including a piston to be controlled by means other than said brake pedal, said first master-cylinder having a pressure fluid outlet directly connected to the hydraulic control-circuit of friction brakes, said second master-cylinder having a pressure-fluid outlet exclusively connected to the first master-cylinder at the place thereof conventionally used to connect said first master-cylinder to a reservoir of supply liquid, said means other than the pressure on the brake pedal being releasable at the initiative of the driver and being arranged to cause only a relatively gentle hydraulic brake-pressure as required from time-to-time during normal running of the vehicle, said first master-cylinder being a tandem master-cylinder which comprises a first piston connected by the intermediary of a linkage to the brake pedal and a second piston dividing the interior cylindrical cavity of said tandem master-cylinder into first and second chambers, said first chamber being situated between said two pistons and connected by a first output-conduit to a first hydraulic brake control-circuit, and said second chamber being situated at an end of said cylinder, and being connected by a second output-conduit to a second hydraulic brake control-circuit, said two chambers being supplied with liquid through respectively two lateral connections, and said output of said second master-cylinder being connected to one of said lateral connections of the first master cylinder, a first reservoir for supplying the second master-cylinder with braking liquid, another reservoir connected to the other of said lateral connections of the first master-cylinder and being an integral part of the first reservoir, the second master-cylinder being situated lower than the first master cylinder, the bottom of said another reservoir being connected directly to said other lateral connection of the first master cylinder and the bottom of said first reservoir being connected by a flexible pipe to the lateral connection for the supply of the second master-cylinder with braking fluid.

* * * * *